US009922640B2

(12) United States Patent
Rao

(10) Patent No.: US 9,922,640 B2
(45) Date of Patent: Mar. 20, 2018

(54) SYSTEM AND METHOD FOR MULTIMODAL UTTERANCE DETECTION

(71) Applicant: Ashwin P Rao, Kirkland, WA (US)

(72) Inventor: Ashwin P Rao, Kirkland, WA (US)

(*) Notice: Subject to any disclaimer, the term of this patent is extended or adjusted under 35 U.S.C. 154(b) by 0 days.

(21) Appl. No.: 14/171,735

(22) Filed: Feb. 3, 2014

(65) Prior Publication Data

US 2014/0222430 A1    Aug. 7, 2014

Related U.S. Application Data

(63) Continuation-in-part of application No. 12/258,109, filed on Oct. 16, 2009, now Pat. No. 8,645,131.

(60) Provisional application No. 61/196,552, filed on Oct. 17, 2008.

(51) Int. Cl.
*G10L 15/04* (2013.01)
*G10L 15/08* (2006.01)

(52) U.S. Cl.
CPC ........ *G10L 15/04* (2013.01); *G10L 2015/088* (2013.01)

(58) Field of Classification Search
USPC .......................................... 704/231–257, 270
See application file for complete search history.

(56) References Cited

U.S. PATENT DOCUMENTS

| 3,943,295 A * | 3/1976 | Martin et al. ................. 704/253 |
| 4,032,710 A | 6/1977 | Martin et al. |
| 4,256,924 A | 3/1981 | Sakoe |
| 4,805,219 A | 2/1989 | Baker et al. |
| 4,897,878 A * | 1/1990 | Boll et al. ..................... 704/233 |
| 4,914,704 A | 4/1990 | Cole |
| 4,949,382 A * | 8/1990 | Griggs .......................... 704/235 |
| 5,027,406 A | 6/1991 | Roberts et al. |
| 5,210,689 A | 5/1993 | Baker et al. |
| 5,231,670 A | 7/1993 | Goldhor et al. |
| 5,293,452 A | 3/1994 | Picone et al. |
| 5,444,768 A | 8/1995 | Lemaire et al. |
| 5,526,463 A | 6/1996 | Gillick et al. |
| 5,583,961 A | 12/1996 | Pawlewski et al. |
| 5,649,060 A * | 7/1997 | Ellozy et al. ................. 704/278 |
| 5,822,730 A | 10/1998 | Roth et al. |
| 5,855,000 A | 12/1998 | Waibel et al. |
| 5,917,890 A | 6/1999 | Brotman et al. |
| 5,937,380 A | 8/1999 | Segan |
| 5,956,683 A | 9/1999 | Jacobs et al. |
| 5,970,448 A | 10/1999 | Goldhor et al. |

(Continued)

FOREIGN PATENT DOCUMENTS

| WO | WO9916051 | 4/1999 |
| WO | WO0146649 | 6/2001 |

OTHER PUBLICATIONS

Junqua, Mak, Reaves, "A robust algorithm for word boundary detection in the presence of noise," IEEE Trans. on Speech and Audio Precessing 2(3): 406-412, Jul. 1994.

(Continued)

*Primary Examiner* — Abul Azad

(57) ABSTRACT

The disclosure describe a system and method for detecting one or more segments of desired speech utterances from an audio stream using timings of events from other modes that are correlated to the timings of the desired segments of speech. The redundant information from other modes results in a highly accurate and robust utterance detection.

23 Claims, 13 Drawing Sheets

(56) References Cited

U.S. PATENT DOCUMENTS

| | | |
|---|---|---|
| 5,991,720 A | 11/1999 | Galler |
| 6,064,950 A | 5/2000 | Young et al. |
| 6,064,957 A | 5/2000 | Brandow et al. |
| 6,064,963 A | 5/2000 | Gainsboro |
| 6,067,514 A | 5/2000 | Chen |
| 6,178,396 B1 | 1/2001 | Ushioda |
| 6,198,808 B1 | 3/2001 | Martin |
| 6,223,150 B1 | 9/2001 | Duan et al. |
| 6,304,844 B1 | 10/2001 | Pan et al. |
| 6,321,196 B1 | 11/2001 | Franceschi |
| 6,327,566 B1 | 12/2001 | Vanbuskirk et al. |
| 6,401,065 B1 | 6/2002 | Kanevsky et al. |
| 6,411,929 B1 | 6/2002 | Ishiwatari et al. |
| 6,421,645 B1 | 7/2002 | Beigi et al. |
| 6,496,799 B1 | 12/2002 | Pickering |
| 6,567,755 B1 | 5/2003 | Maali et al. |
| 6,601,027 B1 | 7/2003 | Wright et al. |
| 6,629,071 B1 | 9/2003 | Mann |
| 6,681,206 B1 | 1/2004 | Gorin et al. |
| 6,694,296 B1 | 2/2004 | Alleva et al. |
| 6,751,591 B1 | 6/2004 | Gorin et al. |
| 6,868,383 B1 | 3/2005 | Bangalore et al. |
| 6,879,956 B1 | 4/2005 | Honda et al. |
| 6,904,405 B2 | 6/2005 | Suominen |
| 6,912,498 B2 | 6/2005 | Stevens et al. |
| 6,934,683 B2 | 8/2005 | Ju et al. |
| 6,965,863 B1 | 11/2005 | Zuberec et al. |
| 6,968,311 B2 | 11/2005 | Knockeart et al. |
| 6,975,986 B2 | 12/2005 | Hartley et al. |
| 6,980,950 B1 | 12/2005 | Gong |
| 7,003,457 B2 | 2/2006 | Halonen et al. |
| 7,006,971 B1 | 2/2006 | Stahl et al. |
| 7,069,215 B1 | 6/2006 | Bangelore et al. |
| 7,085,720 B1 | 8/2006 | Gorin et al. |
| 7,092,870 B1 | 8/2006 | Chen et al. |
| 7,143,037 B1 | 11/2006 | Chestnut |
| 7,149,970 B1 | 12/2006 | Pratley et al. |
| 7,254,537 B2 * | 8/2007 | Otani ................. G10L 21/0208 704/200 |
| 7,315,813 B2 | 1/2008 | Kuo et al. |
| 7,505,908 B2 | 3/2009 | Johnston et al. |
| 7,548,859 B2 | 6/2009 | Thompson et al. |
| 7,634,409 B2 | 12/2009 | Kennewick et al. |
| 7,720,682 B2 | 5/2010 | Stephanick et al. |
| 7,908,142 B2 | 3/2011 | Yamada |
| 7,966,188 B2 | 6/2011 | Ativanichayaphong et al. |
| 8,355,915 B2 | 1/2013 | Rao |
| 8,688,446 B2 * | 4/2014 | Yanagihara ................... 704/235 |
| 8,719,014 B2 * | 5/2014 | Wagner ......................... 704/231 |
| 2002/0135618 A1 | 9/2002 | Maes et al. |
| 2002/0138265 A1 | 9/2002 | Stevens |
| 2003/0112277 A1 | 6/2003 | Shteyn |
| 2004/0083109 A1 | 4/2004 | Halonen et al. |
| 2004/0091037 A1 * | 5/2004 | Balasubramonian et al. ............................ 375/232 |
| 2004/0172258 A1 | 9/2004 | Dominach et al. |
| 2004/0199358 A1 * | 10/2004 | Tai ................. 702/179 |
| 2004/0199385 A1 | 10/2004 | Deligne et al. |
| 2005/0043947 A1 | 2/2005 | Roth et al. |
| 2005/0049858 A1 | 3/2005 | Busayapongchai |
| 2005/0283364 A1 | 12/2005 | Longe et al. |
| 2006/0015336 A1 | 1/2006 | Parthasarathy |
| 2006/0100879 A1 | 5/2006 | Jakobsen et al. |
| 2007/0046645 A1 | 3/2007 | Hirota et al. |
| 2007/0106507 A1 * | 5/2007 | Charoenruengkit .... G10L 15/20 704/233 |
| 2007/0276651 A1 | 11/2007 | Bliss et al. |
| 2009/0055174 A1 | 2/2009 | Han et al. |
| 2009/0182550 A1 | 7/2009 | Gerl et al. |

OTHER PUBLICATIONS

Lamels, Rabiner, Rosenberg and Wilpon, "An improved endpoint detector for isolated word recognition." IEEE ASSP Mag., 29:777-785, 1981.

Evangelopoulos, Maragos, "Speech event detection using multiband modulation energy," in Ninth European Conference on Speech Communication and Technology, 2005.

Wu, Zhang, "Maximum margin clustering based statistical VAD with multiple observation compound feature," Signal Processing Letters, IEEE, No. 99, pp. 1-1, 2011.

Mehta, Pham, GHNG, "Linear dynamic models for voice activity detection," in Conference of the International Speech Communication Association, 2011.

* cited by examiner

SYSTEM AND METHOD FOR MULTIMODAL UTTERANCE DETECTION

CROSS-REFERENCE TO RELATED APPLICATIONS

This patent application is a continuation-in-part of U.S. application Ser. 12/581,109, filed Oct. 16, 2009, which claims priority to U.S. Provisional Patent Application No. 61/196,552, filed Oct. 17, 2008, which are incorporated in their entirety herein by reference.

FIELD OF THE INVENTION

The invention relates to the areas of user interfaces and speech recognition.

BACKGROUND INFORMATION

The area of speech recognition has witnessed tremendous growth recently. It is now pervasive in everyday devices like cellular phones, tablets, laptops, as well as in newly introduced gadgets including smartwatches, smartglasses, internet ready appliances, and wearable computers. Although speech technology has improved multifold, it is still plagued with several problems, especially problems related to background noise. It is known that a speech recognition engine's accuracy increases significantly when the recognizer is presented only with the speech segment that corresponds to the desired spoken text and the neighboring noise segments are removed via a process called utterance detection. Apart from accuracy, robust utterance detection is also useful to lower the speech processing times, which is advantageous for devices and networks with resource constraints.

Several attempts to reliably detect utterances have been proposed. Most of them rely on using signal energy along with statistical thresholds, Other less commonly used approaches incorporate alternative features including zero-crossings rate, periodicity and jitter, pitch stability, spatial signal correlation, spectral entropy, cepstral features, LPC residual coefficients, modulation features, alternative energy measures, temporal power envelope, spectral divergence, and other time-frequency parameters. Some references include (a) J.-C. Junqua, B. Mak, and B. Reaves, "A robust algorithm for word boundary detection in the presence of noise," *IEEE Trans. on Speech and Audio Processing*, 2(3):406-412, July 1994; (b) L. Lamels, L. Rabiner, A. Rosenberg, and J. Wilpon, "An improved endpoint detector for isolated word recognition," *IEEE ASSP Mag.*, 29:777-785, 1981; (c) G. Evangelopoulos and P. Maragos, "Speech event detection using multiband modulation energy," in Ninth European Conference on Speech Communication and Technology, 2005; (d) J. Wu and X. Zhang, "Maximum margin clustering based statistical VAD with multiple observation compound feature," Signal Processing Letters, IEEE, no. 99, pp. 1-1, 2011; and (e) K. Mehta, C.-K. Pham, and E.-S. Chng, "Linear dynamic models for voice activity detection," in Conference of the International Speech Communication Association, 2011.

Several other systems have attempted to address the utterance detection problem. In U.S. Pat. No. 6,980,950, "Automatic utterance detector with high noise immunity" the inventors propose an utterance detector for speech recognition consisting of two components. The first part makes a speech/non-speech decision for each incoming speech frame using power spectral analysis. The second component makes utterance detection decisions using a state machine that describes the detection process in terms of the speech/non-speech decision made by the first component. In U.S. Pat. No. 6,496,799, "End-of-utterance determination for voice processing", the inventors propose a method that uses semantic and/or prosodic properties of the spoken input to determine whether or not the user input has effectively completed speaking. In U.S. Pat. No. 4,032,710, "Word boundary detector for speech recognition equipment," an apparatus is described that receives acoustic input including words spoken in isolation and finds the word boundary instants at which a word begins and ends.

Unfortunately the problem of reliable and robust utterance detection continues to lack the desired accuracy.

To overcome some of the problems associated with automatic utterance detection, systems have been proposed that implement intelligent ways to design user interfaces. For example, recently mobile interfaces that have a "push button to speak" followed by a "push button to stop" have been implemented. However, these solutions experience problems when a user forgets to synchronize their speaking with the push buttons and speaks before pushing the start button or continues to speak after pressing the stop button. In any event, there are several applications wherein this type of user interface needs to be relaxed. For instance, some applications only have a button to speak but do not have a button to stop. Other applications implement an always listening mode that lacks manual buttons to start/stop the audio.

Having robust utterance detection for applications is important. Until now, a solution that provides a robust utterance detection method for any type of application has eluded those skilled in the art.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The following disclosure describes a multimodal utterance detector that uses knowledge from multiple modes to detect a desired segment of speech from an audio segment.

It is widely accepted that humans have little problems in robustly detecting utterances even in extremely noisy environments. Research shows that apart from complex neural processing, humans also rely on a concept called "multimodal interaction." Simply put this means that humans use knowledge from other modes (location, touch, eye indication, gestures etc) to reliably process sounds. Inspired by this biological processing, and building upon the inventor's earlier work, the present application is directed at a multimodal utterance detector that uses knowledge from multiple modes to robustly detect speech utterances.

The proposed invention finds immediate application in the multimodal speech to text systems. Those skilled in the art will appreciate that the invention may also be applied to any scenario in which information from other modes and/or application specific information is available.

Specifically in accordance with at least one embodiment of the present invention, a user speaks word(s) (i.e., speech event) and timing(s) correlated with the speech event(s) are obtained from separate mode(s). Using these timings, a multimodal utterance detector filters a continuous audio stream of speech segments to determine a desired speech segment(s).

Figure 1:
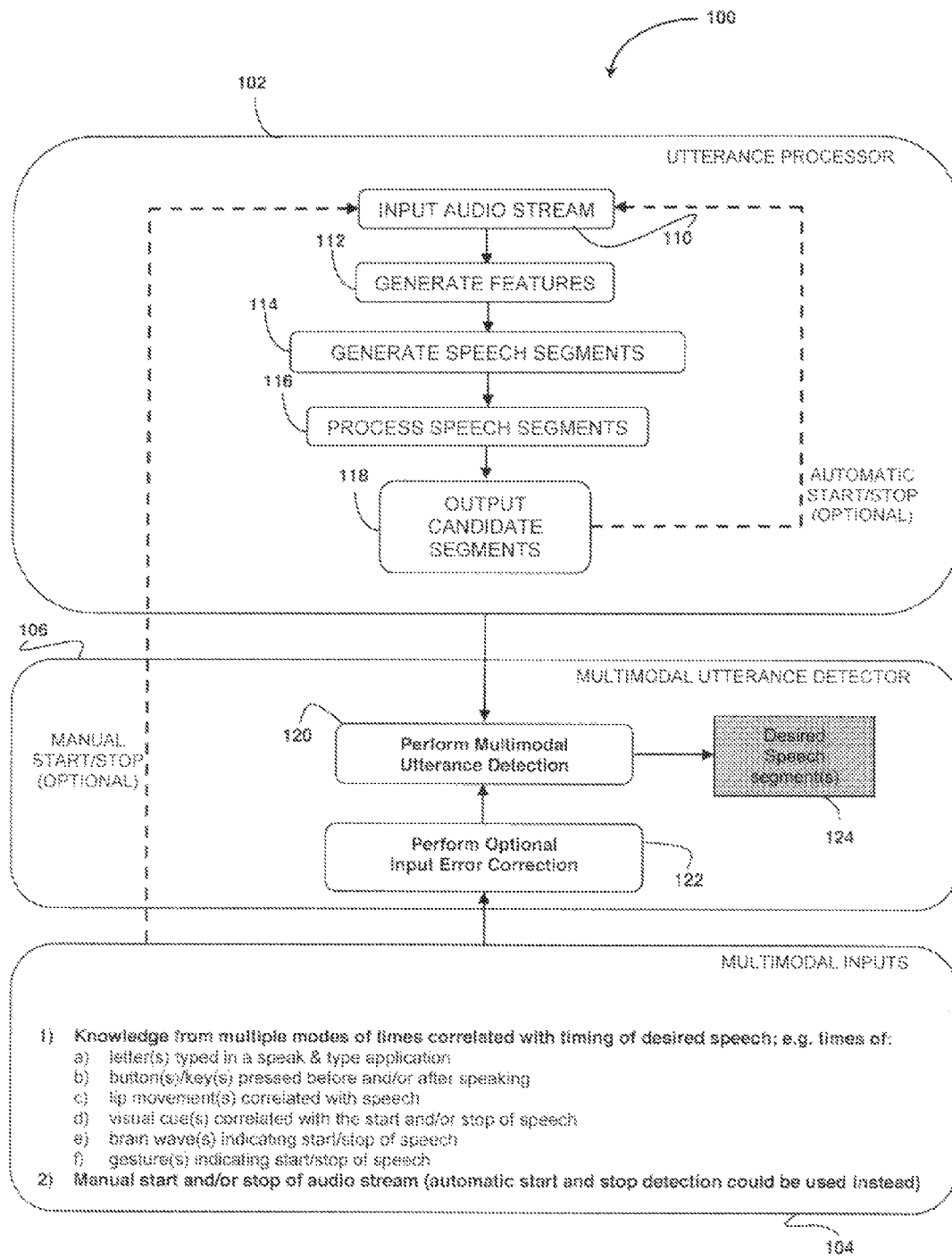
FIG. 1 is a conceptual overview of a process that incorporates multimodal utterance detection in accordance with the present application.

FIG. 1 is a conceptual overview of a process 100 that incorporates a multimodal utterance detector 106 in accordance with the teachings in the present application. An utterance processor 102 inputs an audio stream 110 and generates features at block 112. These features may be generated by signal processing, which results in acoustic-phonetic or prosodic features. The features may also be generated using speech recognition that results in outputs of generally acoustic-linguistic features including phoneme and/or syllables and/or words and/or other forms of text. Details of generating acoustic-phonetic or prosodic features or acoustic-linguistic features are described in the inventor's earlier published patent application, U.S. patent application Ser. No. 12/581,109.

The generated features are used to generate speech segments at block 114. The generated speech segments include timing markers associated with each generated speech segment. The timing markers may indicate a start time and/or a stop time for each generated speech segment. The generated speech segments are then processed at block 116. Specifically, the processing of the generated speech segments uses certain known characteristics of speech and/or specific knowledge from an application under consideration to filter the generated speech segments in a manner such that noise may be discarded, which results in outputting valid speech candidate segments at block 118.

Examples of filtering the speech segments using characteristics of speech include, but are not limited to: (a) removing spikes or impulse noise that are known to be usually very short in duration by discarding segments whose durations are very short; (b) treating speech segments that have relatively low energy as background noise and eliminating the low energy speech segments; and (c) filtering speech segments that lack a desired formant, pitch or prosodic structure.

Examples of filtering the speech segments using application specific knowledge may include, but are not limited to; (a) using knowledge that a valid speech segment corresponds to a single English word and knowing that single English words have an average duration of ½ second and therefore, removing speech segments that do not conform to this knowledge; (b) using knowledge that a valid speech segment corresponds to one or more digits or symbols and therefore removing speech segments that may not conform to this knowledge; (c) filtering out specific types of sound like background music; (d) filtering out speech segments with certain characteristic acoustic features (e.g., speech segments exhibiting a pitch of less than 120 Hz); and (e) concatenating speech segments that are close in proximity if the application under consideration does not allow long inter word pauses. The application specific knowledge may be known a priori or the knowledge may be obtained dynamically during runtime of the application under consideration.

After processing the speech segments using the filtering process described above, candidate speech segments are output at block 118. The candidate speech segments include their associated timing markers.

The candidate speech segments 118 are then input into a multimodal utterance detector 106. The multimodal utterance detector 106 receives multimodal inputs 104. The multimodal inputs 104 may optionally be corrected by an input error correction process at block 122 before being available for performing multimodal utterance detection at block 120. At block 120, multimodal inputs are correlated with candidate speech segments to aid in determining desired speech segment(s) that are output at block 124. The multimodal utterance detection process identifies the desired speech segment(s) as the candidate speech segment(s) whose timings best match the timings obtained from the multimodal inputs 104 via the optional input error correction process.

The knowledge of times received from multimodal inputs 104 may be ambiguous/unambiguous times around which the desired speech segment 124 starts and/or stops and/or occurs. The specifics of these timings will be discussed in conjunction with subsequent figures using several different scenarios. For now, it is noted that the timings themselves may be obtained from a variety of different modes. For example, the timings may correspond to: (a) letters entered in a "speak and touch type" application; (b) activation of a button to indicate a start/stop of speech; (c) lip movements correlated with speech that indicate activities of speech; (d) visual cues correlated with the start/stop and events happening in speech; (e) brain waves detected that indicate presence/absence of speech activity; and/or (f) gestures that indicate a start/stop/events of speech.

Those skilled in the art will recognize that the process 100 illustrated in FIG. 1 may be implemented in real-time or in a non real-time manner depending upon the requirements of the application under consideration. Further the process 100 could be implemented on a device or could reside on a network. In addition, the multimodal inputs 104 include both manual starting and automatic starting of the audio stream. As such, the start and/or stop of utterance could be manually controlled or automatically detected using utterance detection or a variation of the two modes. Further the start and stop of utterance may be designed to be ambiguous by processing audio from previous and next audio sessions respectively. Even further, the utterance processor 102 may be replaced by any standard utterance detector that essentially yields one or more candidate speech segments 118, which are then processed by the multimodal utterance detector 106 in accordance with the teachings of the present application.

Those skilled in art will recognize that the one or more candidate speech segments 118 may be non-overlapping in time or may be overlapping in time with other segments of speech. Finally, the ordering of the processing within process 100 may be interchanged based on what best suits the application under consideration. For instance, the multimodal utterance detector 106 may first take the timings from the multimodal inputs 104 (optionally being processed by input error correction) and around these timings process the audio stream.

FIGS. 2 through 6 illustrate various scenarios in which the present multimodal utterance detector 106 may be operated in order to yield desired speech 124. The illustration of the multimodal utterance detector 106 remains mostly consistent throughout the figures, except that the desired speech that is output will be different for the different scenarios that are presented. The processing performed by the multimodal utterance detector is dependent on the multimodal inputs and the processing of the candidate speech segments that are input to the multimodal utterance detector. An explanation for the different outputs will now be described in conjunction with each of the illustrations in FIGS. 2-6. The explanations will focus on the processing that is different between the many scenarios in order to clarify different aspects of the proposed multimodal utterance detection process.

Figure 2:
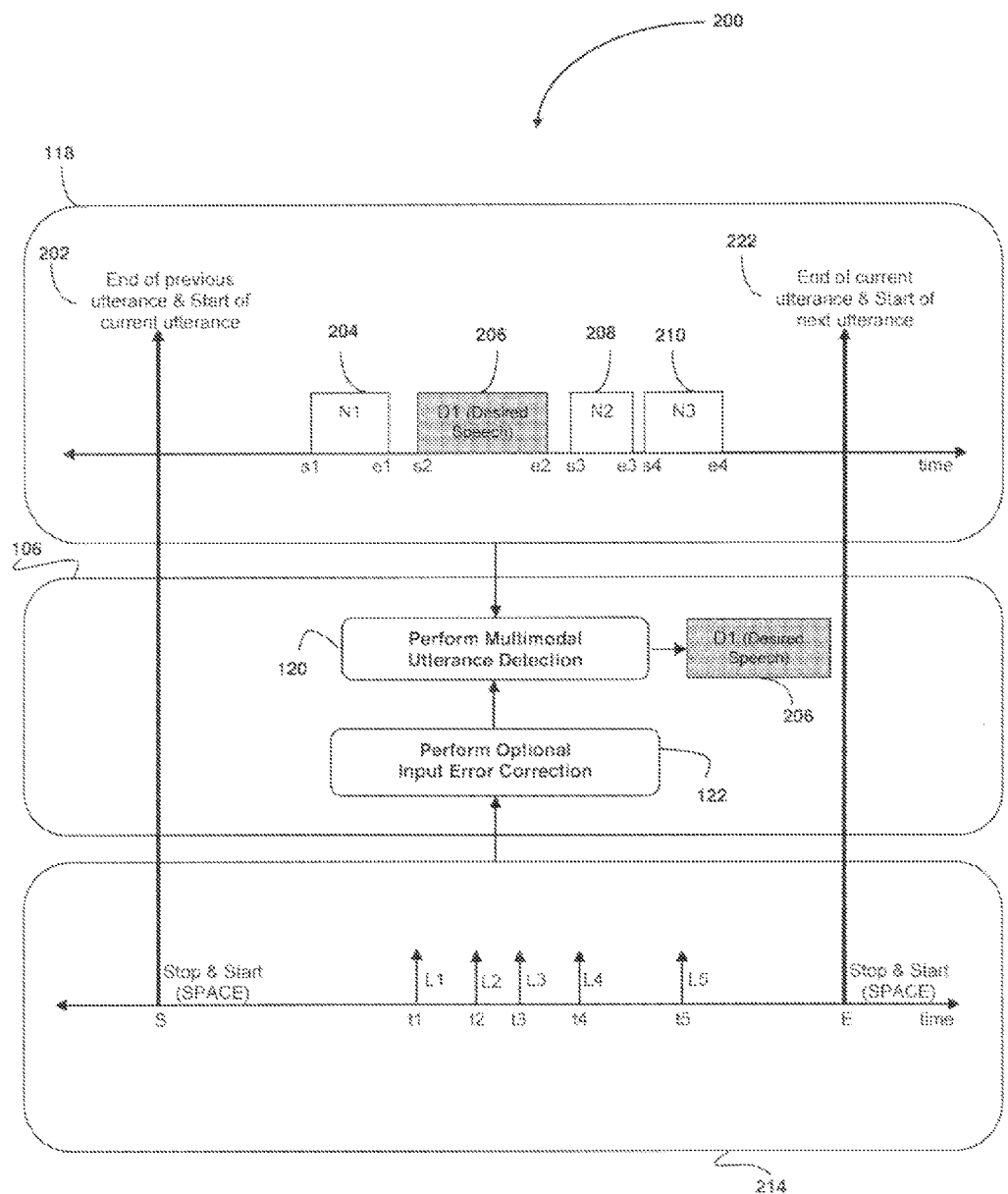
FIG. 2 illustrates one embodiment of multimodal utterance detection when the desired speech includes a single word and another mode includes a keyboard having keys that are entered while the single word is being spoken.

FIG. 2 illustrates a typical "speak and touch typing" application scenario wherein a user, while sloppily and partially typing a word, is also speaking that word. After finishing speaking, the user either types all the remaining letters of the word and hits a space key or partially types the word and then hits the space key. The system underlying this application extracts the speech segment spoken by the user, sends it to a multimodal speech recognition engine, along with the letters typed by the user. The multimodal speech recognition engine determines recognized output and uses the recognized output to finally correct the sloppily and partially typed word. A problem in this scenario is whether the word spoken by the user is accurately extracted by filtering out the surrounding noise segments. The multimodal utterance detector of the present application addresses this problem. The processing for this scenario is described below.

Referring back to the overall process 100 as shown in FIG. 1, the utterance processor 102 takes the user's continuously recorded audio stream as input at block 110 and generates features from them at block 112. Using these features, a set of speech segments along with their start and stop times are generated at block 114. Next, these speech segments are processed at block 116 using certain generic speech specific knowledge and knowledge specific to the "speak and touch typing" application. In this scenario, the application specific knowledge may include, but not limited to, a priori knowledge that the candidate speech segments are each a maximum duration of 1.5 seconds and that the speech segments do not include long pauses.

FIG. 2 illustrates candidate speech segments 204-210. Each candidate speech segment includes a start time and an end time. For example, candidate speech segment 204 is associated with start time s1 and end time e1, candidate speech segment 206 is associated with start time s2 and end time e2, candidate speech segment 208 is associated with start time s3 and end time e3, and candidate speech segment 210 is associated with start time s4 and end time e4. The candidate speech segments 204-210 occur between a start of speech marker 202 and an end of speech marker 222, wherein the start of speech marker 202 is also the end of utterance for a previous utterance and the end of speech marker 222 is also the start of utterance for a next utterance. FIG. 2 illustrates that candidate speech segments 204, 208, and 210 are filtered out (represented as noise segments N1, N2, and N3) during the multimodal utterance detection leaving candidate speech segment 206 as the desired speech (represented as desired speech D1).

The multimodal utterance detector 106 determines the desired speech 206 based on multimodal inputs 214 including time indicator t1, t2, t3, t4, and t5, which correspond to entry of letters, letter L1, L2, L3, L4, and L5, respectively. Letters L1-L5 may correspond to partial/full ambiguous/unambiguous spellings of a word(s), such as "s" "q" "r" "s" and "o" entered for the word "awesome" that corresponds to candidate speech segment 206, the desired speech D1.

In accordance with the proposed invention, during input error correction processing 122, a check is performed to determine any errors in detection of an end of speech (i.e. "End of current utterance") indicator 222. If the end of speech indicator 222 is determined to be valid, the multimodal utterance detector 106 proceeds by taking the candidate speech segments 204-210 between the valid start of speech indicator 202 and the valid end of speech indicator 222 and finding the candidate speech segment that best matches the timings t1, t2, t3, t4, and t5. In the scenario illustrated in FIG. 2, candidate speech segment 206 best matches the timings t1, t2, t3, t4, and t5 and is thus determined to be the desired speech 206. The multimodal utterance detector then filters out the remaining candidate speech segments 204, 208, and 210 as noise segments N1, N2, and N2, respectively. FIGS. 7 and 8 illustrate one embodiment for an input error correction process and a best match process, respectively, and will be described later in detail.

Those skilled in the art will recognize that the audio stream in one embodiment of the "speak and touch typing" application scenario may be stopped and started using a keyboard's space-bar. When a user selects the space-bar, the current utterance is stopped and a next utterance is started immediately or after some steps depending on the application designer's choice. In other embodiments, stopping the current utterance and starting the next utterance may be achieved using an automatic start and end of speech detection. Furthermore, during automatic detection, because the start and stop of speech may not be exact, the multimodal utterance detector may process additional audio buffers from previous and/or next audio sessions in order to refine the start and stop of speech, respectively. A scenario in which automatic detection is implemented is described later in conjunction with FIG. 5B.

Figure 3A:
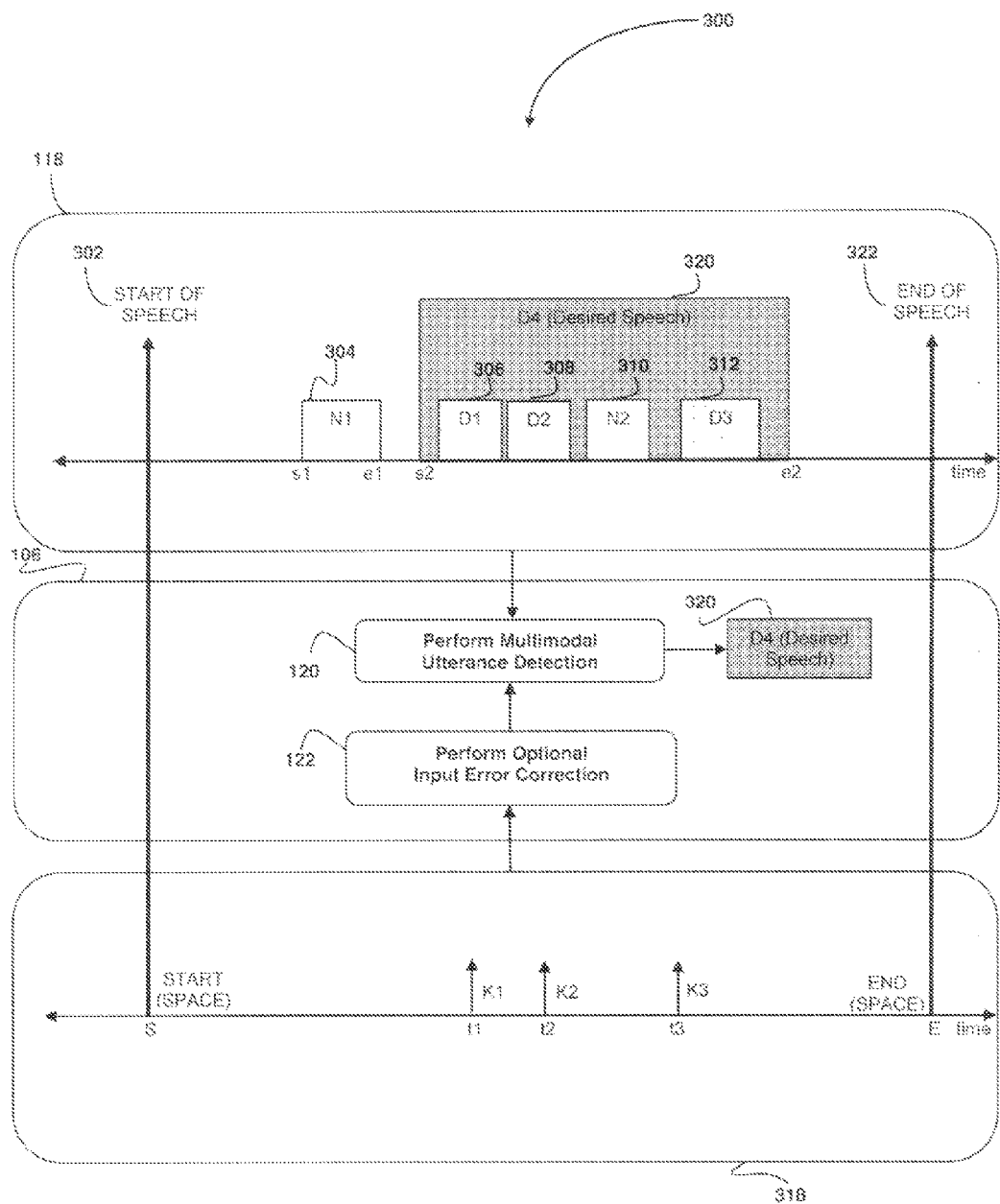
FIG. 3A illustrates one embodiment of multimodal utterance detection when the desired speech includes a single segment having multiple words and another mode includes a keyboard having keys that are entered while the words are being spoken (one key for each word)

FIG. 3A illustrates a scenario 300 in which the desired speech 320 is determined to include multiple candidate speech segments 306-312 as opposed to a single candidate speech segment 206 in the scenario illustrated in FIG. 2. An example of this scenario may be entering of a mobile password in a mobile password verification application. In this scenario, a user may speak a combination of digit(s), alphabetic letter(s), and/or symbol(s) and press the corresponding key(s). Upon completion, the user may hit a submit button. For this scenario illustrated in FIG. 3A, the candidate speech segments 304-316 may be processed using knowledge that the desired speech is at least 3 digits long with optional pauses and noise in between the digits. For example, candidate speech segments 306-312 may be filtered based on the multimodal inputs including key presses K1, K2, and K3, occurring at t1, t2, and t3 respectively. Key presses K1, K2, and K3 may be ambiguous number keys, such as 3 2 6, pressed to indicate the number sequence 317. Alternatively K1, K2, and K3 may be ambiguous letter keys pressed (to blindly enter digits), such as E W Y to indicate 317. The multimodal utterance detector recognizes that the key press may correspond to candidate speech segments 306, 308, and 312 (represented as desired speech D1, D2, and D3), while candidate speech segment 310 is recognized as noise (represented as noise N2). In this figure, the candidate segments 304 and 310 are undesired noise segments N1 and N2, respectively.

Those skilled in the art may recognize that the scenario illustrated in FIG. 3A may relate to applications in which individual words may represent any text in any language. For example, the individual words may be phonemes in Mandarin. Also, the key presses may be replaced by gestures (same for all or one for each word) or any other forms of input.

Figure 3B:
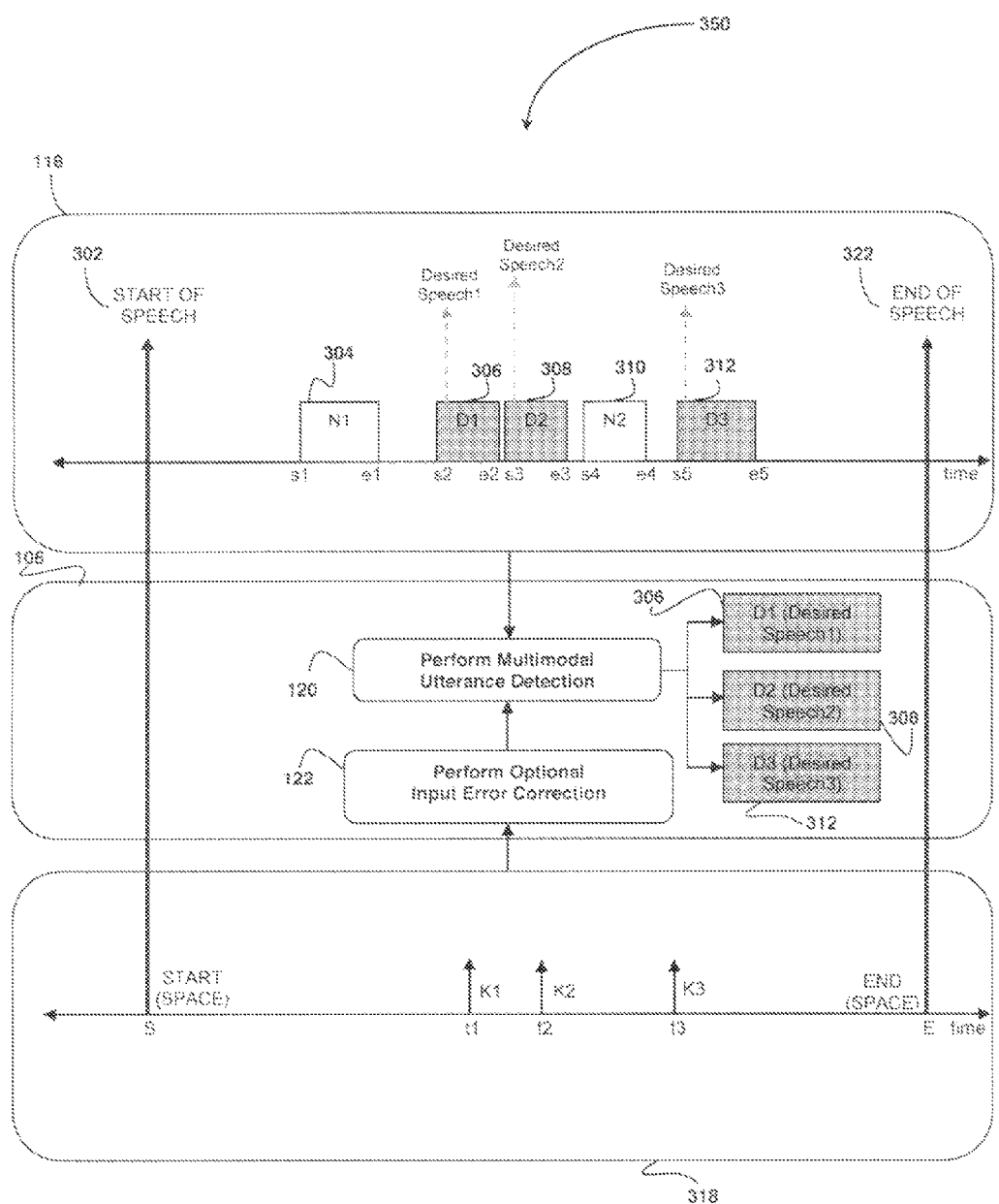
FIG. 3B illustrates one embodiment of multimodal utterance detection when the desired speech segments include multiple words and another mode includes a keyboard having keys that are entered while the words are being spoken (one key for each word)
Figure 3C:
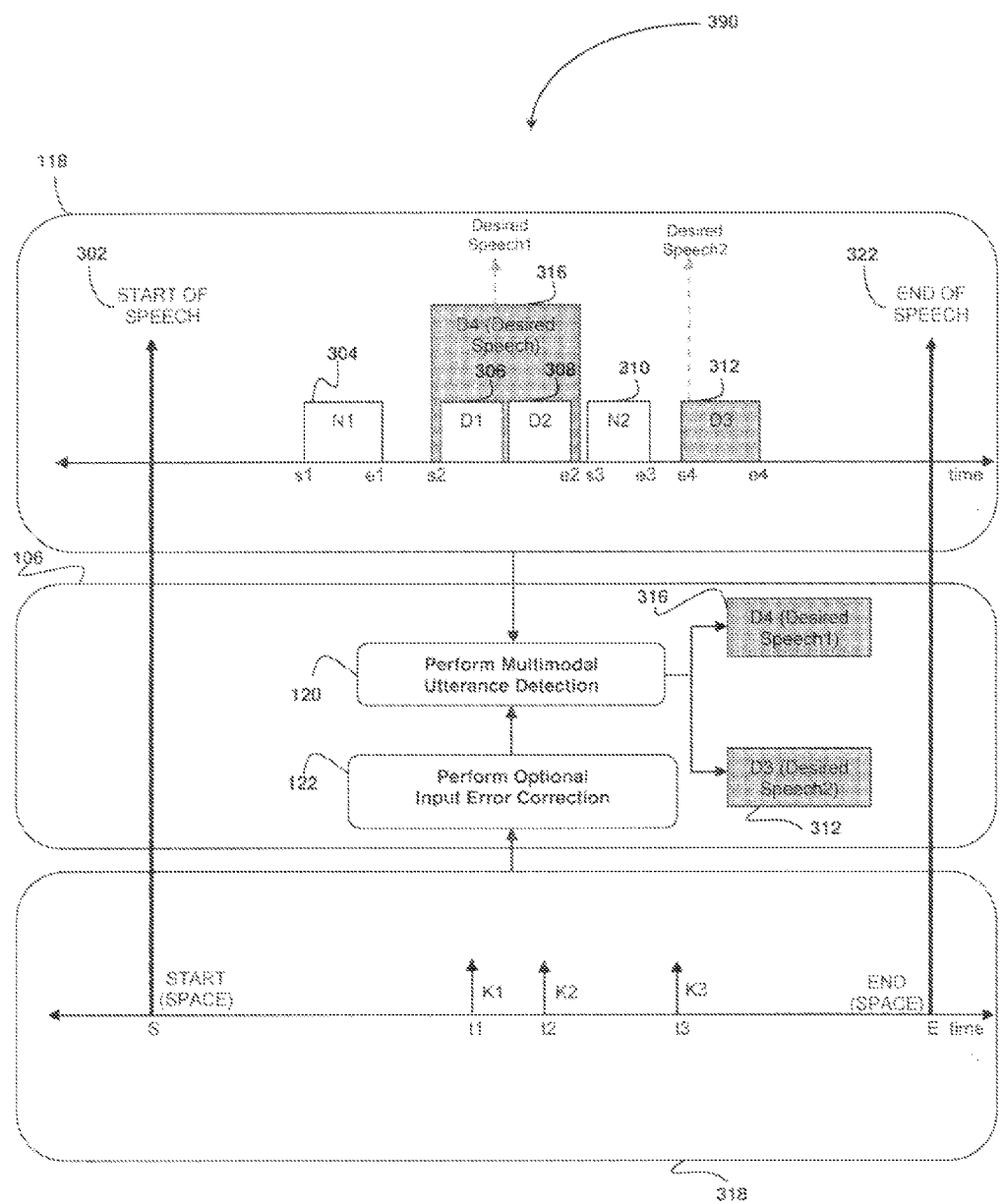
FIG. 3C illustrates one embodiment of multimodal utterance detection when the desired speech segments includes two speech segments where one segment includes multiple words and the other segment includes a single word and another mode includes a keyboard having keys that are entered while the words are being spoken (one key for each word)

FIGS. 3B and 3C illustrate extensions of FIG. 3A wherein instead of having a desired speech that is a single segment, multiple desired speech segments are identified. Specifically observe that in FIG. 3B the desired speech segments include candidate speech segments 306, 308, and 312 (represented as desired speech D1, D2, and D3. FIG. 3C illustrates desired speech segments that include candidate speech segments 306, 308 and 312 (represented as desired speech D1, D2, and D3). Desired speech D1 and D2 are combined to form D4 i.e. the desired speech 316 and D3 corresponds to desired speech 312. For these scenarios, the multimodal utterance detector 108 extracts the multiple desired segments as will be described later in conjunction with FIG. 7.

Figure 4:
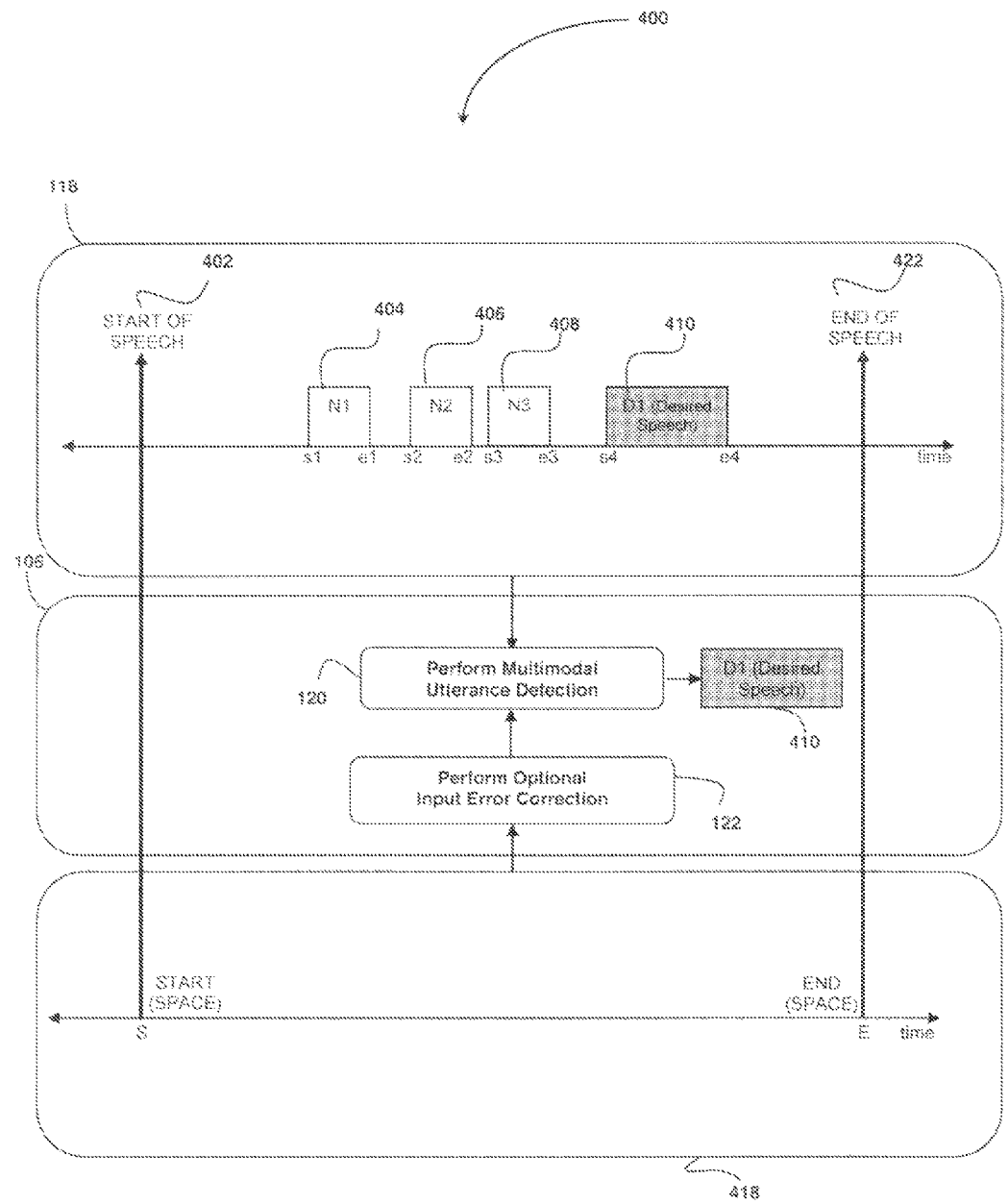
FIG. 4 illustrates one embodiment of a "speak and then push button" interface viewed as a multimodal interface wherein the desired speech includes single/multiple words and another mode includes a button that is activated immediately after speaking the word(s)

FIG. 4 illustrates a scenario 400 in which a user may speak the symbol "comma" followed by the pressing of a space bar, such as in an email application on a mobile phone. Upon close examination of this scenario, one may recognize that this scenario may be a special case of the multimodal scenario in which the end of speech indicator 422 is included as an input from the multimodal input 418. All subsequent processing may then be carried out as described above in conjunction with FIG. 2. The results is out of the four candidate speech segments 404-410, three of the candidate speech segments 404-408 are identified as noise (N1, N2, N3) and one candidate speech segment 410 is identified as desired speech 410 (D1). In this scenario, the desired speech 410 represents some text, such as a work, phrase, command, or the like.

Figure 5A:
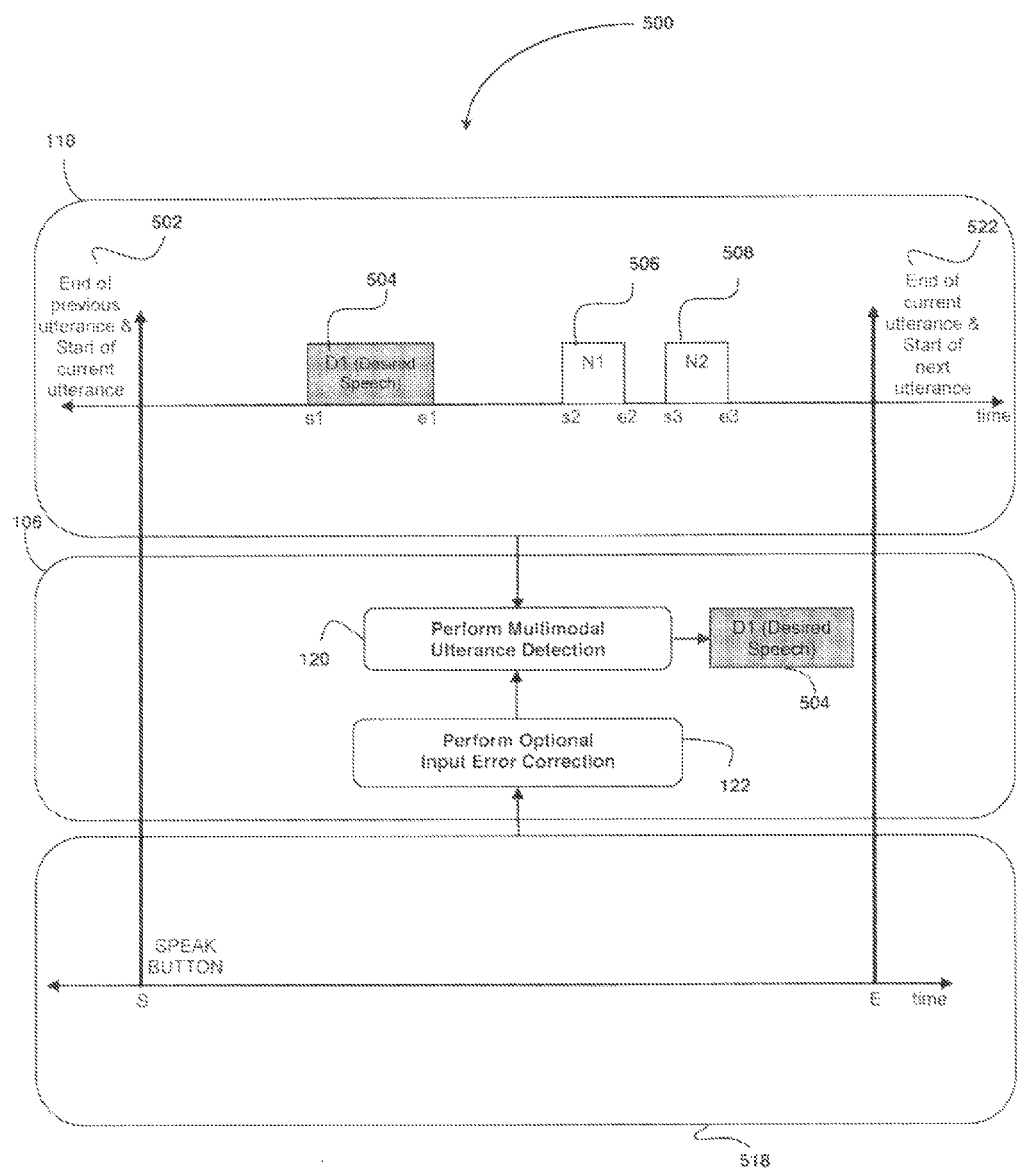
FIG. 5A illustrates one embodiment of "push button to speak" interface viewed as a multimodal interface wherein the desired speech includes single/multiple words and another mode includes a button that is activated immediately before beginning to speak the word(s)

FIG. 5 illustrates a scenario 500 in which a user may activate a "speak" button and say a phrase, such as "What's the weather in Seattle." In this scenario, one may recognize that this scenario may be a special case of the multimodal scenario in FIG. 2, and is a reverse of the scenario in FIG. 4, where a user indicates start of speech indicator 502 and then utters the desired speech 504. The multimodal utterance detector identifies the first candidate speech segment 504 as the desired speech 504 and identifies the other two candidate speech segments 506 and 508 as noise N1 and N2.

Therefore, in accordance with the teachings of the present application, scenarios formerly considered as merely standard single-modal interfaces (e.g. "speak and then push button" and "push button then speak") may be made more robust and reliable by implementing them as a special case of multimodal utterance detection.

Figure 5B:
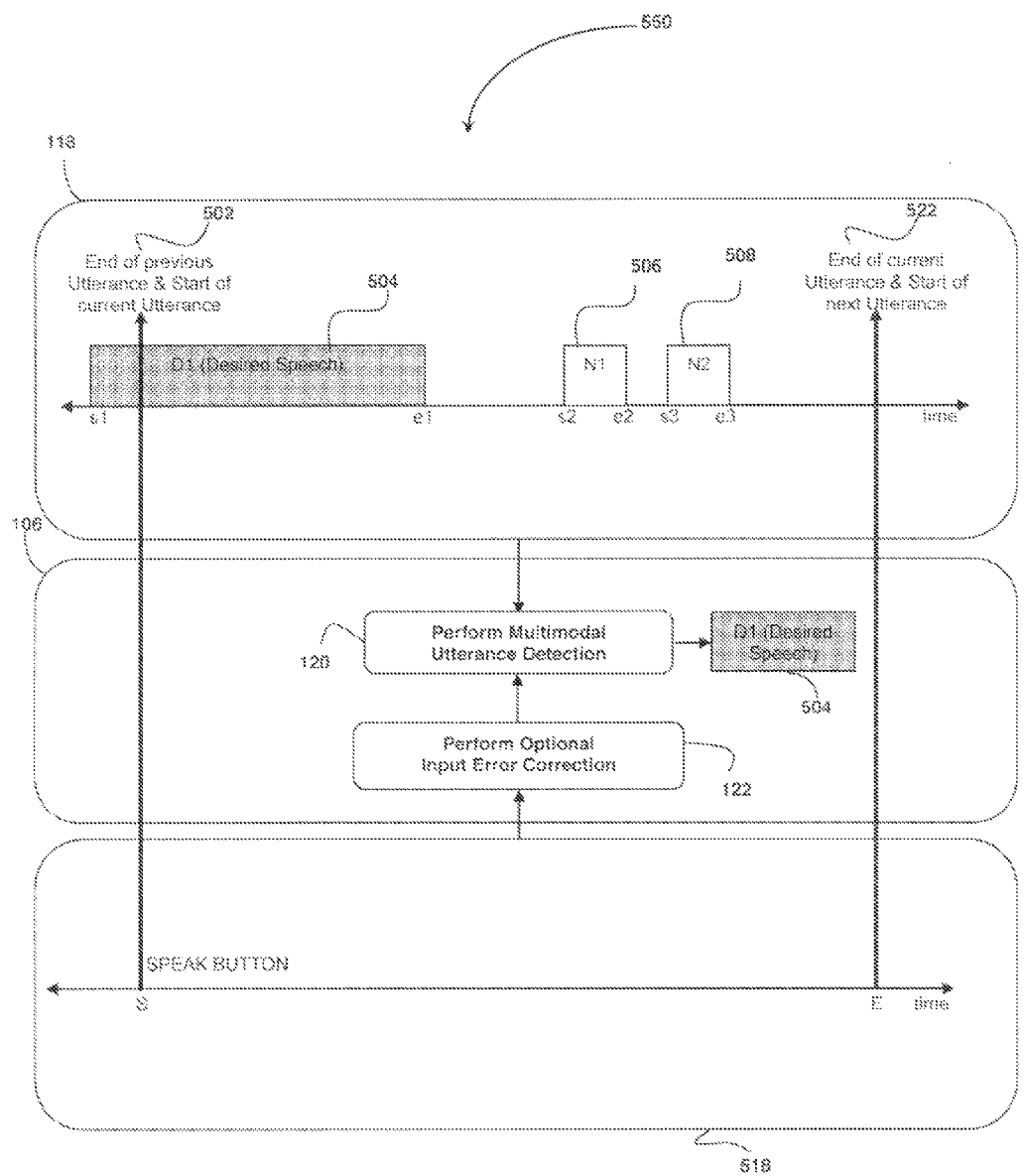
FIG. 5B illustrates one scenario in which the "push button to speak" interface is utilized and the desired speech is spoken before activating the speak button.

One of the problems associated with speech recognition interfaces based on "push button to speak" revolves around the ambiguity associated with the start button's timing. The ambiguity occurs because while users are supposed to press the button and then begin speaking, many times users forget that they need to speak after activating a speak button (e.g., pressing a button, after listening to a beep, after looking at a pop-up that indicates "begin speaking"). Instead the user starts speaking slightly before pressing the speak button. This scenario is illustrated in FIG. 5B. One will note that candidate speech segment 504 starts at s1 which is before the start time S of the speak button activation indicator 502. The result is an utterance that is chopped, which in turn affects the recognition accuracy.

The proposed invention addresses this problem by (a) replacing the manual start button by an audio stream 118 that is always recording as shown in FIG. 5B, (b) by viewing the start button as a button press that's part of a multimodal input 518, and (c) by retrieving the cut-off speech by processing audio from the audio session recorded prior to the pressing of the speak button. Thus, the accuracy of the overall system is increased. Those skilled in art will recognize that standard techniques to keep histories or past buffers of audio from different sessions may be used to implement this method and standard techniques to turn off the "always recording" (e.g. turn off the microphone when a mobile phone's backlight goes off) can be used to conserve battery life.

Figure 6:
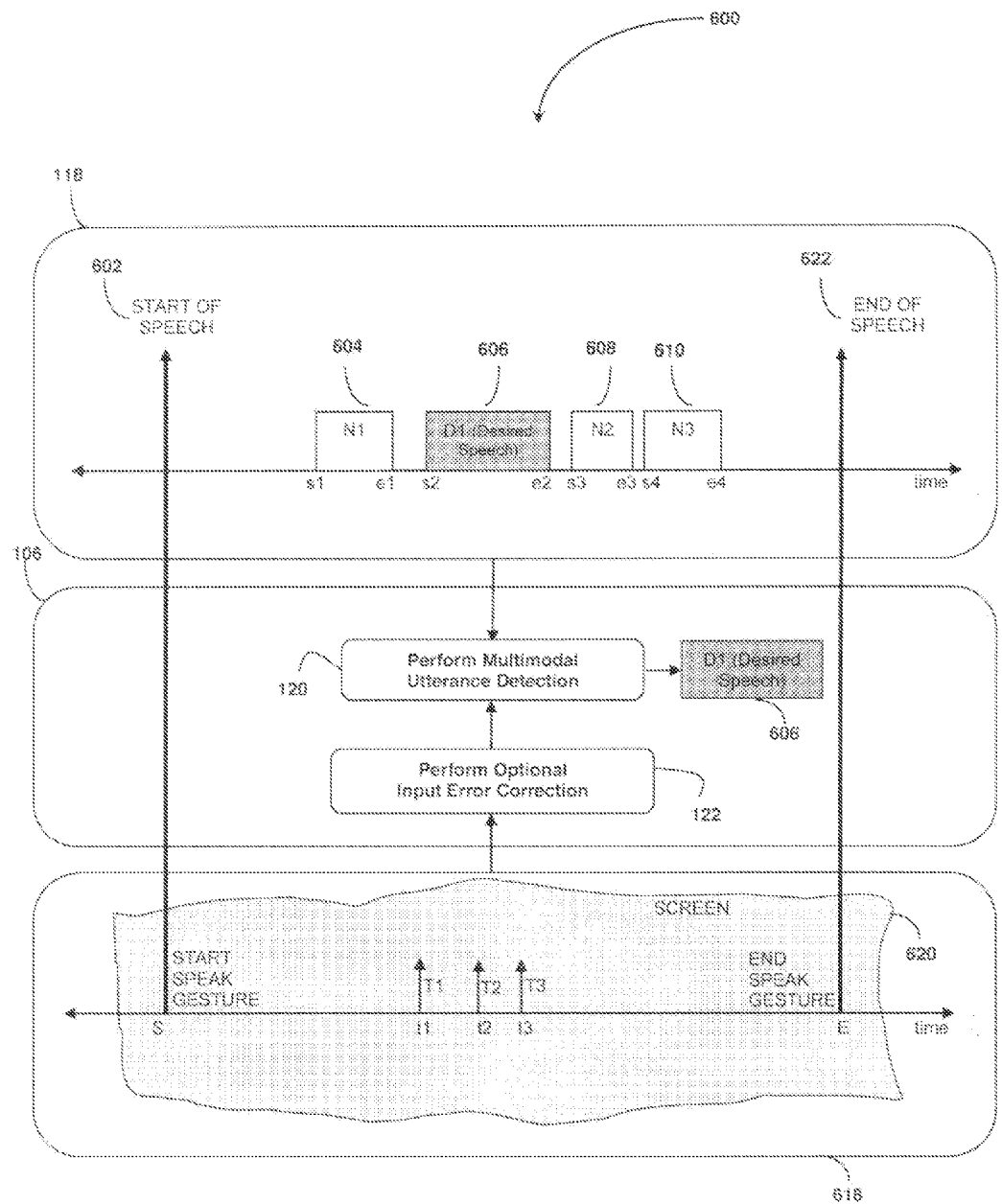
FIG. 6 illustrates one embodiment of multimodal utterance detection when the desired speech segment(s) includes word(s) and another mode includes a screen that is interacted with to indicate timings that are correlated with the utterance.

FIG. 6 illustrates a scenario 600 in which the multimodal information is not associated to keys or buttons, but is rather associated with touch events and/or gestures that indicate timing of events. For this scenario, a screen may be an image, a video screen, a scan picked up by a camera, a still photo captured by a video camera, and infrared projection onto a surface, and the like. The screen is represented as screen 620 in FIG. 6. A start speak indicator S (e.g., start gesture) indicates a start of speech 602 to the utterance detector and an end of speak indicator E (e.g., end gesture) indicates an end of speech 622 to the utterance detector. Time markers t1, t2, and t3 may correspond to an action associated with the display, such as a gesture, pointing, tapping or the like, and are represented as timing indicators T1, T2, and T3. As illustrated, for this scenario, the multimodal utterance detector identifies three candidate speech segment 604, 608, and 610 as noise N1, N2, and N3, which are discarded and identifies candidate speech segment 606 as the desired speech 606 (D1). As will be described in greater detail in conjunction with FIG. 7, desired speech 606 is the candidate speech segment most closely associated with timing indicators T1, T2, and T3. Some examples of applications are considered to shed more light into the applicability of this scenario include: (a) user speaks the name of a city and touches a location or points to a location on a map; (b) while wearing smart glasses, a user points to keys projected onto the palm or a wall or some surface; (c) a user asks a query while touching or pointing at a video screen; and (d) a lip or gesture reader or location finder or a remote control button reader correlates a user's speech while the user is attempting to query a television screen. While these provide some applications in which the present multimodal utterance detection technique may be used, one skilled in the art will appreciate that there are multiple other applications in which the technique may also be used.

Figure 7A:
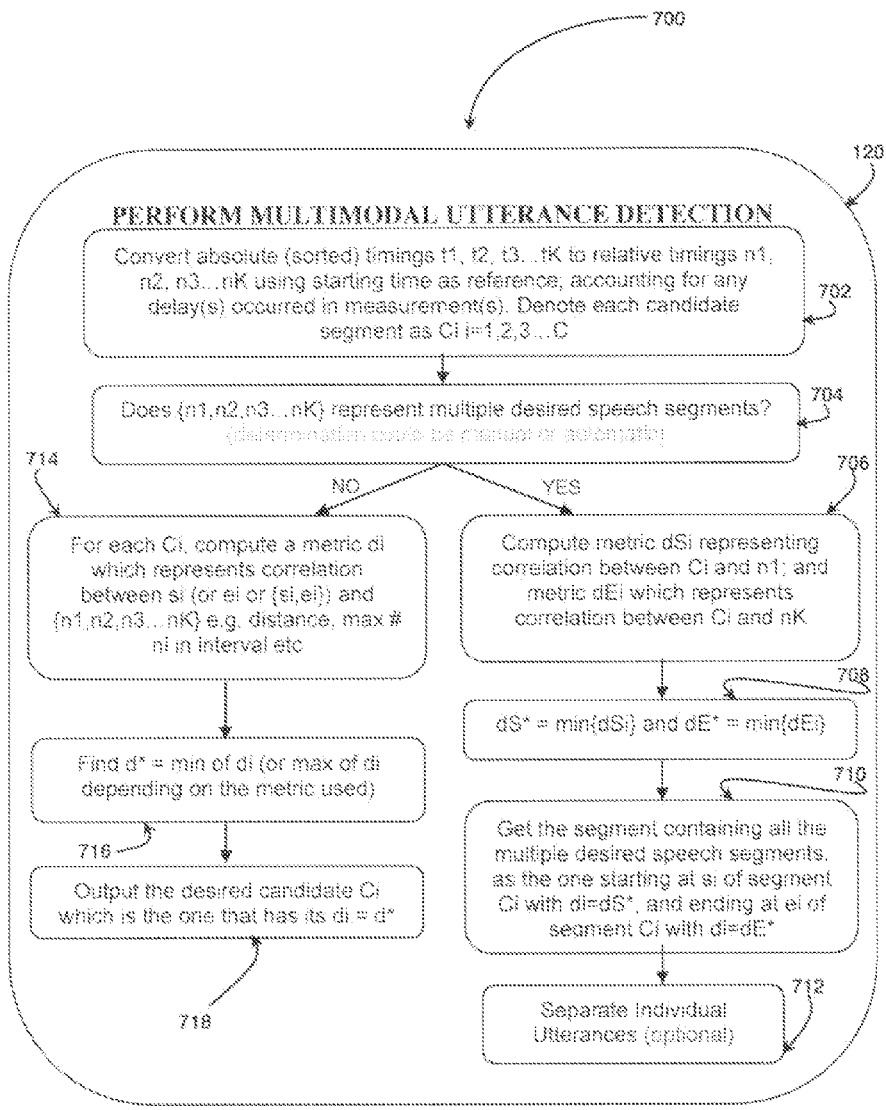
FIG. 7A illustrates one embodiment of the multimodal utterance detection method that finds a closest matching speech segment (i.e., the desired speech) from a set of candidate speech segments using information about timings related to the desired speech segment obtained from a different mode.
Figure 8:
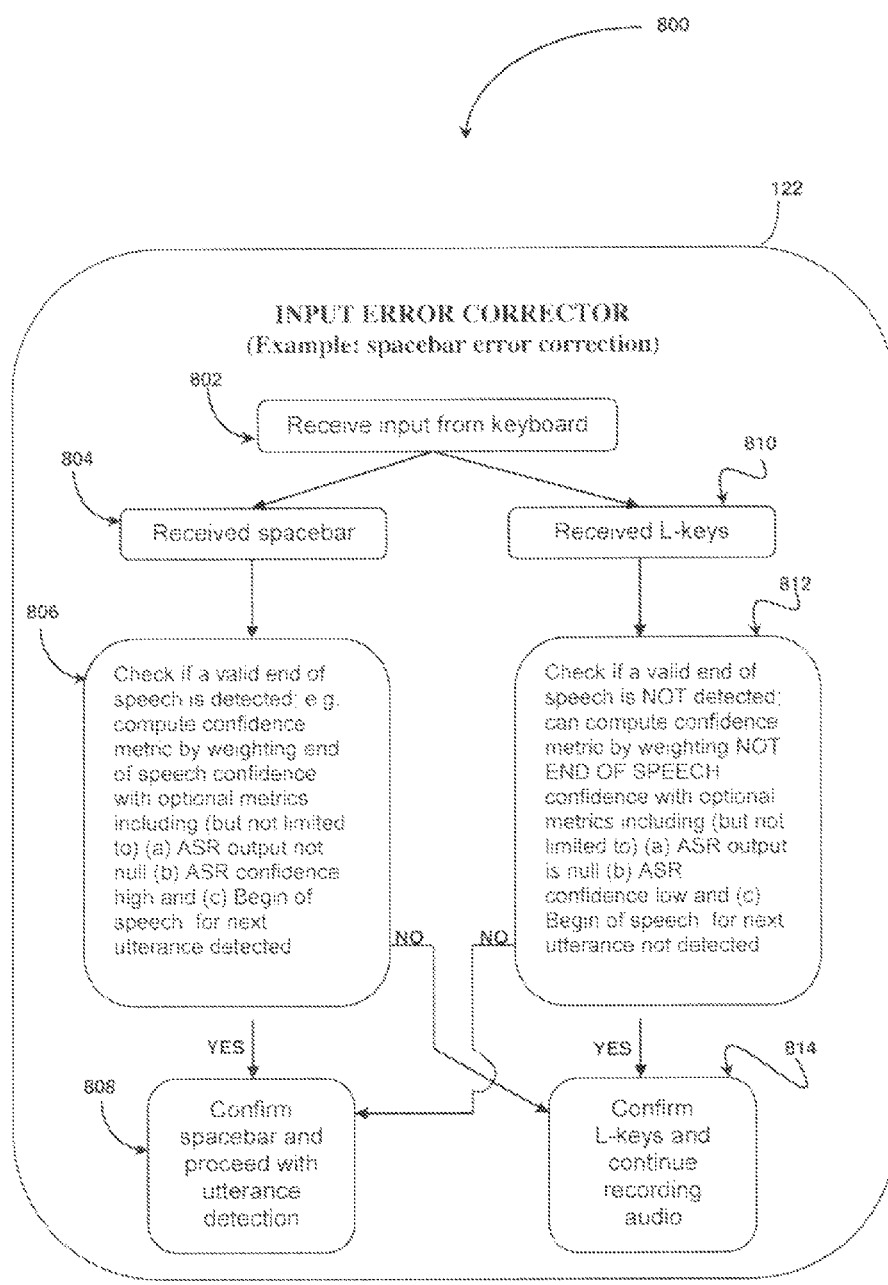
FIG. 8 illustrates one embodiment of an error correction method to correct errors and/or ambiguities in multimodal inputs.

FIG. 7A illustrates an embodiment of a process 700 for finding the desired speech out of the provided candidate segments. The examples of FIG. 2 and FIG. 3B are considered for ease of explanation. However, in FIG. 7A, the candidate segments are denoted as C1, C2, C3, and so on for ease of explanation of the processing. Observe that in FIG. 2 the filtered candidates 118 include potential candidate segments 204, 206, 208, and 210. The multimodal utterance detector 106 determines that the desired speech is candidate segment 206. Now observe that the timings of key presses in the multimodal input 214 include timings t1, t2, t3, t4, and t5, which are supplied to the multimodal utterance detector 106. Using these timings, the multimodal utterance detector 106 finds the best candidate segment (i.e., desired speech D1/candidate segment 206). The multimodal utterance detector finds the desired speech by performing the processing illustrated in FIG. 7A.

At block 702, the multimodal utterance detector converts the absolute times t1, t2, t3, t4, and t5 into relative times n1, n2, n3, n4, and n5 respectively, using starting time S as a reference and accounting for any delays in measurements of t1-t5. In one embodiment, if the measurement delay in measuring t1 is represented as m1, then relative time n1 would be (t1-m1)-(S-m0) where S is the initial start time and m0 is the delay in measuring the initial start time.

At block 704, the multimodal utterance detector checks whether the relative timings n1, n2, n3, n4, n5 represent a single desired speech segment or multiple segments. This determination may be manual or automatic depending upon the application. For example, if all keys on the first row of a qwerty keyboard are used as ambiguous inputs for digits then the fact that all the keys received map to the 1st row of a qwerty keyboard would indicate a high likelihood that the user intended to type multiple digits as opposed to a word. If it is determined that there is only one desired speech segment, processing continues at block 714.

At block 714, the multimodal utterance detector determines a metric for each candidate segment $C_i$, where "i" represents integers 1-z. The metric(s) represent correlations for the candidate segments $C_i$, which may be used in determining a best match for the desired speech. In one embodiment, the correlations may be based on start time $s_i$ of the candidate segment, the end time $e_i$ of the candidate segment, and/or a combination of both the start and end time $\{s_i, e_i\}$ and relative times $\{n_1 \text{ to } n_K\}$. For example, based on FIG. 2, the correlations may be an absolute distance such as abs(s1-n1)+abs(s1-n2)+abs(s1-n3)+abs(s1-n4)+abs(s1-n5). The absolute distance $d_i$ is determined for each candidate segment $C_i$.

At block 716, a maximum or minimum, depending on the metric, is identified using the results of the processing performed in block 714. In one embodiment, the minimum absolute distance is identified, which correlates to one of the candidate segment.

At block 718, the candidate segment fitting the identified metric criteria is output. For example, the candidate segment having the minimum absolute distance is output.

At block 704, if it is determined that there are multiple desired speech segments, processing continues at block 706. At block 706, a metric that correlates between the candidate segment and a relative time n may be calculated. In one embodiment, the first relative time n1 and a last relative time nK may be used to determine a metric. For example, the metric dS1 representing correlation between C1 and n1, metric dS2 representing correlation between C2 and n1, dS3 representing correlation between C3 and n1, dS4 representing correlation between C4 and n1, and metric dS5 representing correlation between C5 and n1 may be determined. In addition, the metric dE1 representing correlation between C1 and n5, dE2 representing correlation between C2 and n5, dE3 representing correlation between C3 and n5, dE4 representing correlation between C4 and n5, and dE5 representing correlation between C5 and n5 may be determined.

At block 708, a minimum or maximum for the calculated metrics may be determined, For example, the minimum of the set {dS1, dS2, dS3, dS4, and dS5} denoted by dS* and the minimum of the set {dE1, dE2, dE3, dE4, and DE5} denoted by dE* may be determined.

At block 710, the multimodal utterance detector evaluates the metrics and determines a start of the first segment and an end of the last segment of the multiple candidate segments. As shown in FIG. 3B, multimodal utterance detector determines that s1 to be the start of the first segment C1 because dS1 is equal to the minimum dS* and also finds e5 to be the end of the last segment C5 because dE5 turns out to be equal to dE*.

Figure 7B:
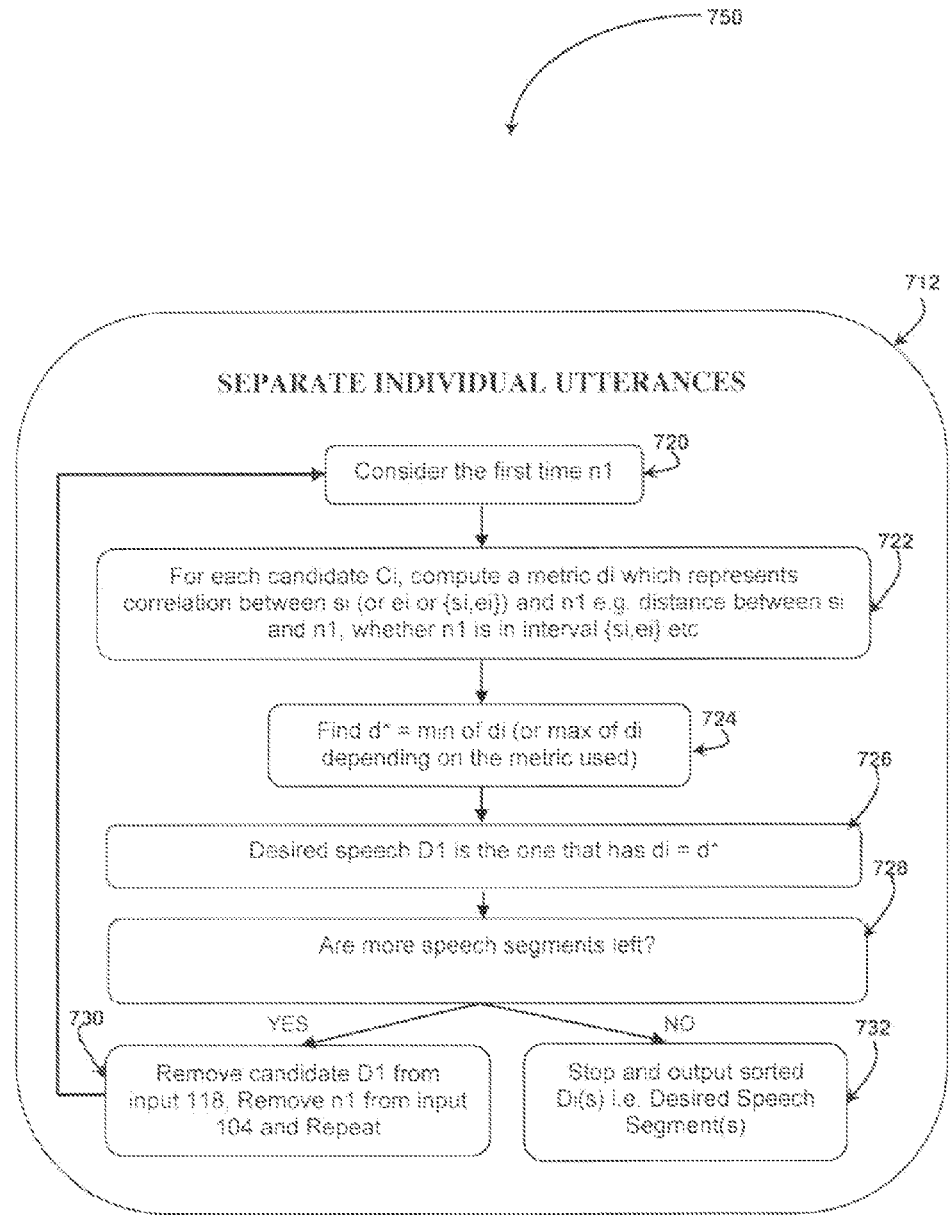
FIG. 7B illustrates one embodiment of a method that separates individual utterances into separate multiple desired speech segments.

At block 712, individual utterances may be optionally separated based on the segments within the region s1 and e5 (e.g., the desired segments C2, C3, and C5 as shown in FIG. 3B, represented as 306, 308 and 312. Optionally separating the desired segments is illustrated in FIG. 7B and will be described later in conjunction with FIG. 7B.

In extremely noisy conditions, the metrics may not be sufficiently robust to get the exact segment(s), which may result in false alarms by choosing neighboring segments. In these situations, the multimodal utterance detector may be associated with a confidence metric to determine whether further actions are needed to extend/repair/ignore the detected utterance. Therefore, the multimodal utterance process 700 may be enhanced by computing a confidence score. The confidence score may be determined using any one or combination of following techniques (a) determining a correlation metric d* minus a threshold (e.g., some metric that indicates that the detected desired speech segment is too far from the key presses); (b) determining a speech recognition confidence score obtained by recognizing the detected desired speech;(c) determining a signal-to-noise ratio (SNR) computed as the average energy of the detected desired speech divided by the average of noise energy computed from neighboring noise segments; (d) determining other acoustic-phonetic features that help compare detected speech with neighboring segments; and (e) determining a pitch in detected desired speech. One may note that an extreme case of zero confidence may simply imply that the user did not speak. Knowing that this may be an outcome, can be extremely useful in many applications. For example, in the speak and touch typing interface, this enables the system to back off to using simple auto correction using only letters typed. Finally, even after additional checks, if the multimodal utterance detector determines that the detected segment and a neighboring segment(s) both seem to be equally likely desired segments, the multimodal utterance detector may concatenate the two or more segments to form a new desired segment.

Those skilled in the art will recognize that the multimodal utterance detector attempts to find the segment that is closest to the correlated timings obtained from different mode(s). Distance di, described above, that uses abs(si−ni) is one way to parameterize the closeness but other metrics may also be used, such as determining the number of times key presses occur in an interval {si, ei}. Alternatively weighted distance di=abs(si−w1*t1)+abs(si−w2*t2)+abs(si−w3*t3)+abs(si−w4*t4)+abs(si−w5*t5) (where w1+w2+w3+w4+w5=1) may be used in a speak and touch typing scenario to give more weight to first couple letters compared to the later ones and ignore some later letters by setting w1=0.6, w2=0.3, w3=0.1, w4=0, w5=0.

Those skilled in the art will further appreciate that the absolute times may be replaced directly by relative times. These times could be in seconds or samples or other units. Further, the delays may be either ignored or calculated using several techniques; software or hardware or from within the operating system. For instance, relative time ni may be the system time and xi may be the time indicated by the buffer holding recorded audio and then the delay may be calculated as (xi−ni) or an average delay may be calculated over several ni's. Additionally, software and/or hardware techniques and architectures to minimize delays may also be designed.

FIG. 7B describes one embodiment for separating individual utterances. Process 750 may be used to separate a single segment into multiple desired speech segments. Once again FIG. 3B is used for ease of explanation and C1, C2, C3, C4, and C5 are used to denote candidate segments 304, 306, 308, 310, 312, respectively. Specifically only the desired segments between s2 and e5 are considered because the neighboring noise has already been removed by the process in FIG. 7.

At block 720, a relative time n1 determined for a first key press is considered.

At block 722, a metric is computed for each candidate segment Ci. In one embodiment, the metric that is computed is based on correlation of the start time si, end time ei, or combination of the start and end time {si, ei} and a relative time. For example, metrics d2, d3, d4, and d5 are computed which represent the correlation between C2, C3, C4, C5 and the time n1.

At block 724, a criteria based on the metric is evaluated. In one embodiment, a maximum or minimum may be used. For example, a minimum d* may be determined, which is the minimum of d2, d3, d4, and d5.

At block 726, based on the criteria selected, determine a desired speech segment. In one embodiment, the desired speech may be determined as the segment associated with the minimum d*. Now, referring to FIG. 3B, candidate segment 306 will be determined to be a desired speech segment.

At block 728, a determination is made whether additional speech segments remain. If there are no more speech segments, processing continues at block 732. If there are more speech segments, processing continues at block 730.

At block 730, the candidate segment and the relative time that was used for processing are removed as inputs and the processing in blocks 720 to 728 with a next relative time and the remaining candidate segments. Now, referring to FIG. 3B, candidate segment 306 will be removed as a desired speech segment and n1 is removed from the set of key presses. Therefore, when processing in blocks 720 to 728 is performed again, relative time n2 is considered. Therefore, eventually C3, and C5 are selected in addition to C2. These three desired speech segments may then be output at step 732.

FIG. 8 illustrates one embodiment of a method 800 to perform input error correction. Method 800 may be performed to correct errors introduced by a user while pressing keys or buttons or doing gestures and other multimodal inputs. For simplicity, process 800 is described in conjunction with an example scenario in which process 800 attempts to resolve ambiguity between a space bar used as an "End of utterance" indicator (scenario in FIG. 2) and the lowest row of keys on a QWERTY keyboard. This problem is specifically related to the scenarios considered in FIGS. 2, 3, and 4. Prior attempts at addressing this problem have focused on using language models to correct space errors. However, as will be described in conjunction with FIG. 8, the present method uses multimodal information to correct space errors.

At block 802, process 800 receives input from a keyboard. The input may be letters pressed or a spacebar pressed to denote "end of utterance" or the like. The problem arises when a user types really fast. Many times, the user mistakenly does one of the following: (a) presses the spacebar when it is intended to press one of the lower row keys (L-keys) i.e. one of the keys z x c v b n m (or c v b depending on the keyboard design) which form the lower row in a qwerty layout and/or (b) presses one of the L-keys when it is intended to press the spacebar to denote end of speech.

Process 800 addresses this problem. At block 802, the input that is received is determined whether is represents a space bar or an L-key. If the input represents a space bar, processing continues at block 804, If the input represents an L-key, processing continues at block 810.

At block 804, if a space bar was received, this may mean that the user intended to indicate an end of speech. Thus, if this is accurate, the space bar indicates that the user has finished speaking the desired speech.

At block 806, a determination is made whether a valid end of speech has been detected. This determination may be based on a confidence metric. For example, a confidence metric may be computed by weighting end of speech confidence with optional metrics including, but not limited to, the following: (a) examining a recognition acoustic and confidence score obtained when the desired speech is sent to an automatic speech recognizer (ASR); (b) determining whether the ASR confidence is high, which indicates that the utterance detector correctly detected a valid desired speech; and/or (c) determining whether begin of speech for the next utterance is received, which indicates that if the user intended end of speech then the user should begin speaking and touch typing for the next utterance. If an end of speech was detected, processing continues at block 808. If an end of speech was not detected, processing continues at block 814.

At block 808, the input of a space bar is confirmed and the utterance detection process is performed.

At block 810, the input of a L-key is recieving.

At block 812, a check is performed as to whether an end of speech was not detected by the utterance detector. The check may include a confidence metric by weighting NOT END OF SPEECH confidence with optional metrics, such determining whether ASR output is null and/or determining whether the ASR confidence is low and/or whether the begin of speech for a next utterance was not detected. If the check results in a determination that the end of speech was not detected, processing continues at block 814. Otherwise, processing continues at block 808.

At block 814, the system confirms that the received input from the keyboard was in fact one of the L-Keys so the system continues recording audio till it gets a spacebar.

At block 808, the system may optionally warn the user interface that a spacebar must have been intended.

Some examples of the space correction are now provided. In example A, a user speaks technology while typing tech then presses n instead of space and moves to the next word, process 800 detects that the n in techn is in fact a [space] and corrects it. In example B, a user speaks technology and types tech[space] [space], process 800 detects that the first [space] was an error and that it was meant to be an n and corrects it. In example C, a user speaks technology and types techn then sees that the n was mistakenly typed instead of a space so instead of deleting the n types a space so that the next keys typed are techn[space], process 800 detects that the n was falsely inserted.

Figure 9:
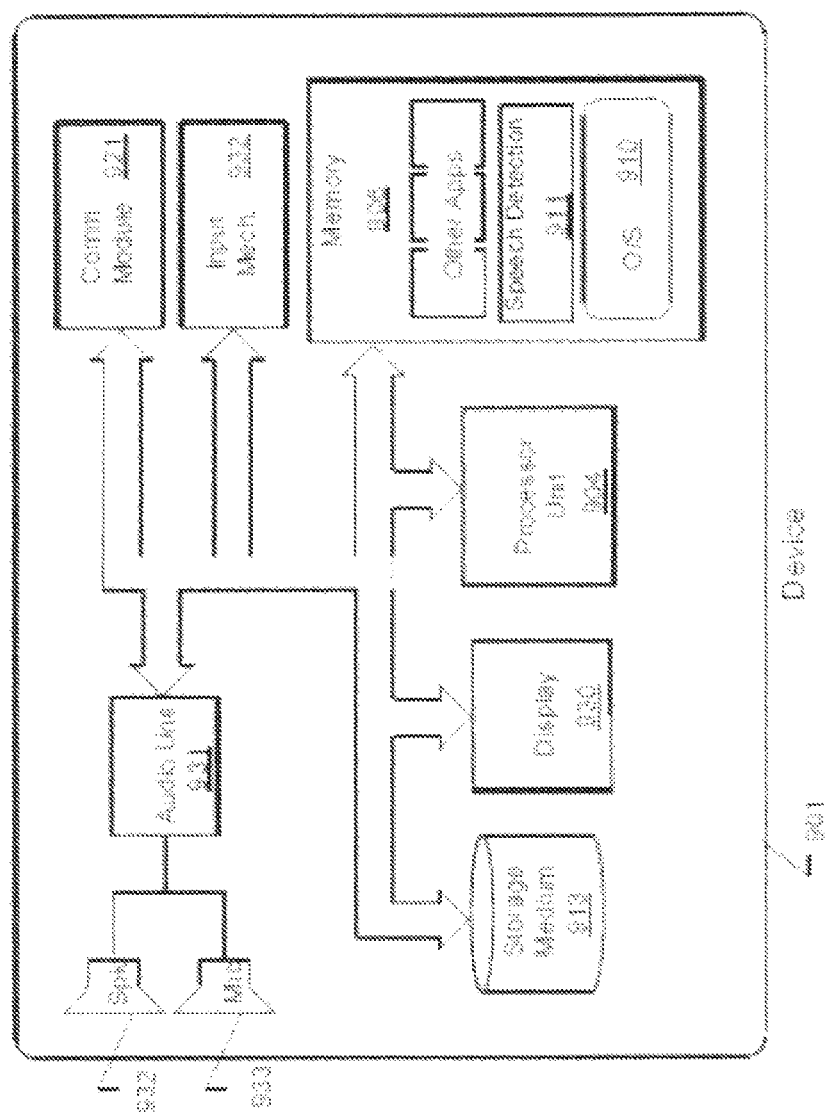
FIG. 9 is a functional block diagram representing a computing device for use in certain implementations of the disclosed embodiments or other embodiments of the utterance detection technique.

FIG. 9 is a functional block diagram representing a computing device for use in certain implementations of the disclosed embodiments or other embodiments of the multimodal utterance detection. The mobile device 901 may be any handheld computing device and not just a cellular phone. For instance, the mobile device 901 could also be a mobile messaging device, a personal digital assistant, a portable music player, a global positioning satellite (GPS) device, or the like. Although described here in the context of a handheld mobile phone, it should be appreciated that implementations of the invention could have equal applicability in other areas, such as conventional wired telephone systems and the like.

In this example, the mobile device 901 includes a processor unit 904, a memory 906, a storage medium 913, an audio unit 931, an input mechanism 932, and a display 930. The processor unit 904 advantageously includes a microprocessor or a special purpose processor such as a digital signal processor (DSP), but may in the alternative be any conventional form of processor, controller, microcontroller, state machine, or the like.

The processor unit 904 is coupled to the memory 906, which is advantageously implemented as RAM memory holding software instructions that are executed by the processor unit 904. In this embodiment, the software instructions stored in the memory 906 include a multimodal utterance detection technique 911, a runtime environment or operating system 910, and one or more other applications 912. The memory 906 may be on-board RAM, or the processor unit 904 and the memory 906 could collectively reside in an ASIC. In an alternate embodiment, the memory 906 could be composed of firmware or flash memory.

The storage medium 913 may be implemented as any nonvolatile memory, such as ROM memory, flash memory, or a magnetic disk drive, just to name a few. The 10 storage medium 913 could also be implemented as a combination of those or other technologies, such as a magnetic disk drive with cache (RAM) memory, or the like. In this particular embodiment, the storage medium 913 is used to store data during periods when the mobile device 901 is powered off or without power. The storage medium 913 could be used to store contact information, images, call announcements such as ringtones, and the like.

The mobile device 901 also includes a communications module 921 that enables bi-directional communication between the mobile device 901 and one or more other computing devices. The communications module 921 may include components to enable RF or other wireless communications, such as a cellular telephone network, Bluetooth 20 connection, wireless local area network, or perhaps a wireless wide area network. Alternatively, the communications module 921 may include components to enable land line or hard wired network communications, such as an Ethernet connection, RJ-11 connection, universal serial bus connection, IEEE 1394 (Firewire) connection, or the like. These are intended as non-exhaustive lists and many other alternatives are possible. 25

The audio unit 931 is a component of the mobile device 901 that is configured to convert signals between analog and digital format. The audio unit 931 is used by the mobile device 901 to output sound using a speaker 932 and to receive input signals from a microphone 933. The speaker 932 could also be used to announce incoming calls.

A display 930 is used to output data or information in a graphical form. The 30 display could be any form of display technology, such as LCD, LED, OLED, or the like. The input mechanism 932 may be any keypad-style input mechanism. Alternatively, the input mechanism 932 could be incorporated with the display 930, such as the case with a touch-sensitive display device. Other alternatives too numerous to mention are also possible.

Those skilled in the art will appreciate that the proposed invention may be applied to any application requiring text-input, including (but not limited to) mobile text-messaging (SMS, MMS, Email, Instant Messaging), mobile search, mobile music download, mobile calendar/task entry, mobile navigation, and similar applications on other machines like the Personal Digital Assistants, PCs, Laptops, Automobile-Telematics systems, Accessible Technology systems etc. Additionally, several implementations of the system including a client-only, a server-only, and client-server architecture may be employed for realizing the system.

The claimed invention is:
1. A computer-implemented speech utterance detection method, the method comprising:
 a) receiving a continuous stream of input;
 b) generating at least one feature from the continuous stream of input;
 c) generating a plurality of continuous stream segments using the at least one feature;
 d) processing the continuous stream segments using characteristics of the continuous stream of input to create a plurality of candidate segments;
 e) receiving a discrete set of inputs, wherein the discrete set of inputs comprise at least one multimodal input from a user interface, wherein each input of the discrete set is associated with a discrete timing information;
 f) separating the candidate segments into at least one separated output, wherein separating comprises grouping a portion of the candidate segments into the at least one separated output by correlating at least one stream timing information associated with the candidate segments with at least one discrete timing information; and
 g) outputting the separated output from the continuous stream of input, wherein the separated output represents a detected speech utterance, thereby selecting the detected speech utterance based on discrete timing information that is non-speech data.

2. The computer-implemented method of claim 1, wherein the continuous stream of input includes an audio stream.

3. The computer-implemented method of claim 1, wherein the continuous stream of input includes a brain wave recording.

4. The computer-implemented method of claim 1, wherein the continuous stream of input includes a recording by an eye-tracking system of at least one object viewed by a user's eye.

5. The computer-implemented method of claim 1, wherein one input of the discrete set of inputs comprises a touch event by a user.

6. The computer-implemented method of claim 1, wherein one input of the discrete set of inputs comprises a gesture by a user.

7. The computer-implemented method of claim 1, wherein one input of the discrete set of inputs comprises one of an eye track, a voice command, and brain wave detection via the user interface.

8. The computer-implemented method of claim 1, wherein correlating the at least one stream timing information with the at least one discrete timing information comprises synchronizing the stream timing information and the discrete timing information.

9. The computer-implemented method of claim 1, wherein correlating the at least one stream timing information with the at least one discrete timing information comprises determining a closest match between the stream timing information and the discrete timing information.

10. The computer-implemented method of claim 1, wherein outputting the separated output from the continuous stream of input comprises outputting a speech utterance representative of the detected speech utterance.

11. The computer-implemented method of claim 1, wherein outputting the separated output from the continuous stream of input comprises outputting a string of text representative of the detected speech utterance.

12. The computer-implemented method of claim 1, wherein the selected speech segment is input for speech recognition.

13. The computer-implemented method of claim 1, wherein generating the at least one feature from the continuous stream of input includes at least one of the following: 1) signal processing to generate acoustic-phonetic or prosodic features, 2) speech recognition processing to generate acoustic-linguistic or textual features.

14. The computer-implemented method of claim 1, wherein generating continuous stream segments includes associating timing markers with the continuous stream segments, wherein the timing markers include start and stop times for each continuous stream segment.

15. The computer-implemented method of claim 1, wherein processing the continuous stream segments using characteristics of the continuous stream of input to create candidate segments includes discarding portions of the continuous stream segments based on at least one of the following characteristics: 1) discarded portion includes a short impulse of noise; 2) discarded portion includes low energy; 3) discarded portion lacks a desired format; 4) discarded portion lacks a desired pitch; or 5) discarded portion lacks a prosodic structure.

16. A system comprising:
a memory for storing computer-readable instructions associated with speech detection; and
a processor programmed to execute the computer-readable instructions to enable the operation of the speech detection, wherein when the computer-readable instructions are executed, the speech detection is programmed to:
a) receive a continuous stream of input;
b) generate at least one feature from the continuous stream of input;
c) generate a plurality of continuous stream segments using the at least one feature;
d) process the continuous stream segments using characteristics of the continuous stream to create a plurality of candidate segments;
e) receive a discrete set of inputs, wherein the discrete set of inputs comprise at least one multimodal input from a user interface, wherein each input of the discrete set is associated with a discrete timing information;
f) separate the candidate segments into at least one separated output, wherein the speech detection is programmed to separate the candidate segments into separated output by correlating at least one stream timing information associated with the candidate segments with at least one discrete timing information; and
g) output the separated output, wherein the separated output represents a detected speech utterance, thereby selecting the detected speech utterance based on discrete timing information that is non-speech data.

17. The system of claim 16, wherein the continuous stream of input includes an audio stream.

18. The system of claim 16, wherein the continuous stream of input includes a recording by an eye-tracking system of at least one object viewed by a user's eye.

19. The system of claim 16, wherein one input of the discrete set of inputs comprise a touch event by a user.

20. The system of claim 16, wherein one input of the discrete set of inputs comprise a gesture by a user.

21. The system of claim 16, wherein generate at least one feature from the continuous stream of input includes at least one of the following: 1) signal processing to generate acoustic-phonetic or prosodic features, 2) speech recognition processing to generate acoustic-linguistic or textual features.

22. The system of claim 16, wherein generate continuous stream segments includes associating timing markers with the continuous stream segments, wherein the timing markers include start and stop times for each continuous stream segment.

23. The system of claim 16, wherein processing the continuous stream segments using characteristics of the continuous stream of input to create a plurality of candidate segments includes discarding portions of the continuous stream segments based on at least one of the following characteristics: 1) discarded portion includes a short impulse of noise; 2) discarded portion includes low energy; 3) discarded portion lacks a desired format; 4) discarded portion lacks a desired pitch; or 5) discarded portion lacks a prosodic structure.

* * * * *